United States Patent [19]

Cruz-Uribe et al.

[11] 4,342,042

[45] Jul. 27, 1982

[54] INK SUPPLY SYSTEM FOR AN ARRAY OF INK JET HEADS

[75] Inventors: Antonio S. Cruz-Uribe, Cobalt; Peter J. Lewis, Monroe; Peter T. Miller, Norwalk, all of Conn.

[73] Assignee: Pitney Bowes Inc., Stamford, Conn.

[21] Appl. No.: 218,391

[22] Filed: Dec. 19, 1980

[51] Int. Cl.³ .............................................. G01D 15/18

[52] U.S. Cl. .............................................. 346/140 R

[58] Field of Search ............................ 346/1.1, 75, 140

[56] References Cited

U.S. PATENT DOCUMENTS

| | | | |
|---|---|---|---|
| 3,102,770 | 9/1963 | McKeegan | 346/140 R |
| 3,104,988 | 9/1963 | Pasinski | 346/140 UX |
| 3,149,904 | 9/1964 | Kossmann | 346/140 |
| 3,258,775 | 6/1966 | Munz | 346/140 UX |
| 3,786,517 | 1/1974 | Krause | 346/75 |
| 3,787,882 | 1/1974 | Fillmore et al. | 346/75 |
| 3,835,881 | 9/1974 | Dal et al. | 346/140 I J X |
| 4,080,113 | 3/1978 | Legeay et al. | 417/477 |
| 4,196,625 | 4/1980 | Kern | 346/140 R X |
| 4,202,267 | 5/1980 | Heinzl et al. | 346/140 X |
| 4,216,477 | 8/1980 | Matsuda et al. | 346/140 PD |

FOREIGN PATENT DOCUMENTS

| | | | |
|---|---|---|---|
| 799565 | 8/1958 | United Kingdom | 346/140 |

*Primary Examiner*—Donald A. Griffin

*Attorney, Agent, or Firm*—Melvin J. Scolnick; William D. Soltow, Jr.; Albert W. Scribner

[57] ABSTRACT

The present invention relates to ink supply system for an ink jet printer comprising a primary ink supply source and a secondary or temporary ink supply reservoir connected in series to an ink transfer conduit which delivers the ink upon demand to the ink jets of the print heads. The secondary ink supply reservoir comprises a thin flexible membrane which serves as the upper surface and which expands or contracts depending upon the amount of ink present in the reservoir. The presence of a proximity device senses the movement of the flexible membrane so as to monitor the quantity of ink present in the reservoir. The secondary reservoir acts as a static pressure regulator for ink entering the ink jets.

24 Claims, 2 Drawing Figures

INK SUPPLY SYSTEM FOR AN ARRAY OF INK JET HEADS

BACKGROUND OF THE INVENTION

This invention relates to an ink supply system for an ink jet printer and more particularly to an ink supply reservoir which acts as a static pressure regulator for ink entering the ink jets of the print head of an ink jet printer.

Impulse type ink jet printers have special ink supply requirements since the usual re-supply mechanism for replacing expelled ink is through capillary action and the ink supply pressure must be within the range of capillary pressure that can be generated by the print head nozzles of the ink jet printer. Since the ink reservoir is typically connected to the print head to provide the low hydrostatic supply pressure, the system is vulnerable to pressure surges generated by the motion of the print head or the supply line due to inertial forces. Thus it is desirable to keep the ink supply source at the same relative level as the ink jets of the print head when they are moved. Inasmuch as the ink supply systems heretofore utilized are generally bulky in nature, it becomes difficult to adjust the ink supply system to the movement of the printhead so as to maintain the necessary pressure requirements to provide the desired printing properties. In addition, the usual arrangement of an impulse ink jet printer is to supply a plurality of droplet ejection devices connected to the same ink supply system. With the presently existing systems of high volume ink jet mechanisms, the link of the re-circulation system to the ink supply and the location of the large ink supply containers contribute further to the difficulty of maintaining the necessary pressure requirements. Heretofore it has become necessary as a result of these disadvantages to isolate the individual ink jet devices from each other, so that they could be independently actuated. Furthermore, all ink jet printing systems function best when there is no air or gas in the lines of the ink supply system or the printhead. This requirement is particularly severe for impulse printers since air bubbles will counteract the incompresible properties of the fluid and prevent the impulse mechanism from working properly. Various techniques to eliminate this problem such as providing special chambers for the air bubbles before they reach the printhead or removing the air from the ink supply before it is used, have been proposed. However, due to the presently existing configurations, these approaches require additional and complicated system adjustments which detract from the overall effectiveness and compactness of the ink jet printer. In addition, with many prior ink jet printers the systems are tuned uniquely for each print head particularly due to the fact that the ink supply is generally bulky and thus must be positioned at a remote location from the print head. This makes adjustments, such as replacement of the print head, difficult and expensive and restricts the movement of the print head within the system when desired, thus further deminishing the flexibility of the specific ink jet printer.

Therefore, it is an object of the present invention to provide an ink supply system for an ink jet printer which will overcome the above stated disadvantages.

It is a further object of the present invention to provide an ink supply system for an ink jet printing device which acts as a static pressure regulator for the ink introduced into the ink jets of the respective printing heads.

Another object of the present invention is to provide a compact ink supply system which simplifies any mechanism necessary to keep the ink which is provided to the print head at the same relative level as the ink jets.

Yet, still another object of the present invention is to provide an ink supply system which allows for the utilization of a high capacity ink container which can be positioned at a remote location from the site of the printhead of the ink jet printer.

A further object of the present invention is to provide an ink supply system capable of supplying an array of ink jets approximately at the same elevation and which is also adaptable to serve a single ink jet.

SUMMARY OF THE INVENTION

The foregoing objects and others are accomplished in accordance with the present invention, generally speaking, by providing an ink supply system in fluid communication with at least one ink jet printhead of an impulse droplet ink jet printer. The ink supply system comprises a primary ink source which supplies the writing fluid or ink to a secondary ink supply container which serves as a temporary reservoir for providing ink at a constant static pressure to the print head of an ink jet printer. The secondary reservoir comprises a low profile-to-diameter cup-like structure having a thin flexible membrane forming its upper surface, sealed at its periphery to prevent spilling of the ink. An air bleed valve is provided so as to allow the reservoir to fill with ink. The thin flexible membrane which seals the top of the secondary reservoir has a small reflective spot on the center thereof which together with a proximity sensor mounted above the membrane provides a level sensing mechanism to detect a change in fluid level within the respective reservoir. The sensitivity of the level sensing mechanism actuates the appropriate valves or pumps to allow the secondary reservoir to fill in a manner which is further discussed below. The secondary reservoir is connected to the ink jet print head in such a way that a constant level is maintained between them.

It has been determined in the course of the present invention that an ink jet printer provided with an ink supply system having a secondary reservoir adapted with a level sensing mechanism which maintains the proper level of ink within the reservoir, can be effectively operated wherein the secondary reservoir serves as a manifold for supplying the ink to the print head nozzles. The compactness of the reservoir simplifies any mechanism necessary to keep the reservoir at the same relative level as the ink jet heads when the latter are moved. This permits the locating of the reservoir extremely close to the print heads. By having a secondary reservoir in accordance with this invention a large size primary ink container can be located remote from the ink jet print head.

The present invention will be more fully understood from the detailed description given hereinbelow and the accompanying illustrations which are intended to describe but not limit the scope of the present invention.

DETAILED DESCRIPTION OF THE INVENTION

Figure 1:
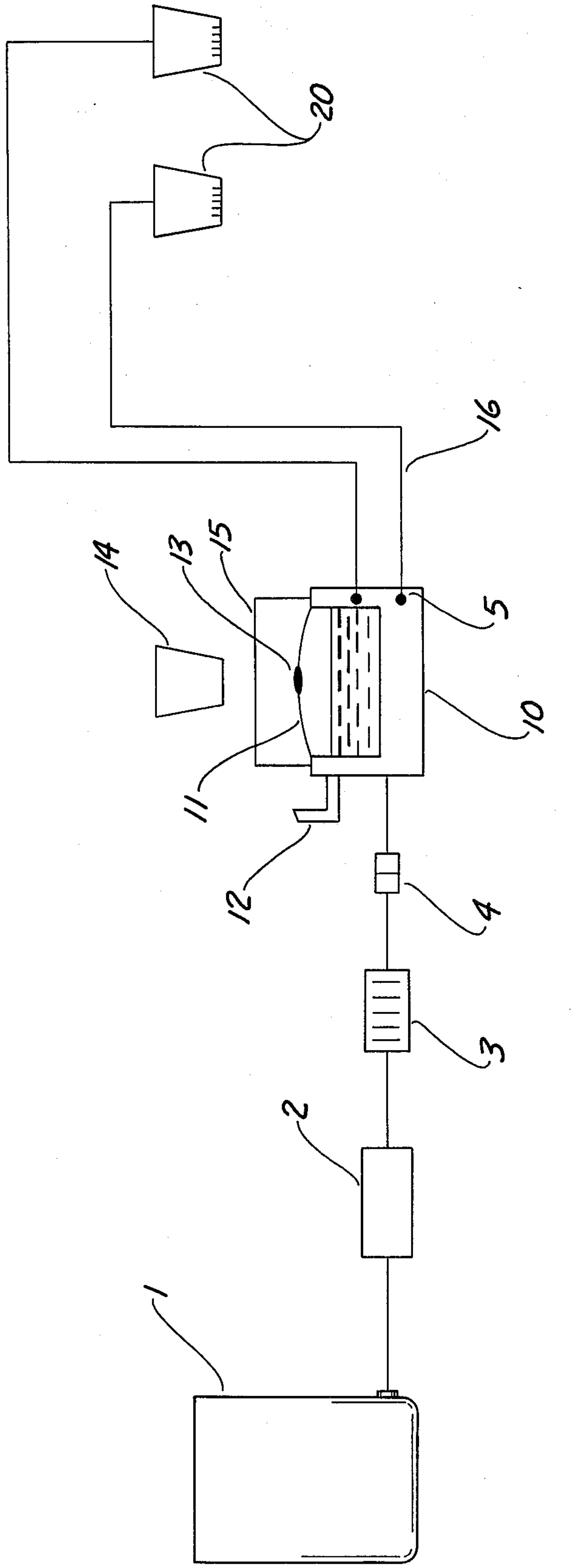
FIG. 1 represents a schematic diagram of the ink supply system of the present invention.

Referring now to FIG. 1, there is seen a schematic diagram representing the ink supply system of the present invention wherein the primary ink supply source 1 supplies ink to the secondary or temporary ink supply reservoir 10 and the ink jet print heads 20. A pump 2 provides ink on command from the primary ink source 1 and channels the ink through a filter 3 to the secondary reservoir 10, which in turn supplies the ink via conduits 16 to the ink jet print heads 20. Any suitable means may be utilized to transport the ink from the primary supply source to the secondary reservoir. The means represented in the illustration takes the form of a peristaltic pump which advances the ink to the secondary reservoir and when not in operation a section of the tubing within the pump is compressed to act as a barrier and prevent the back-flow of ink. The pump operates at low volume displacements typically on the order of 0.25 ml. per minute. However, other types of means can be used for transporting the ink from the primary supply source to the secondary reservoir, such as for example, a gravity feed system. The presence of the filter eliminates remnant particles which may slough off the inner tubing wall of the pump. The filter pores are generally less than about 10 microns. The filter itself can be in the form of a replacement cartridge which is readily interchangeable. A quick disconnect attachment 4 with sealing on both sides provides a double seal and enables the removal of the secondary reservoir and ink jet print heads for filling or service without ink loss or air entry. The secondary reservoir 10 serves as a manifold or central supply for the ink jet print heads or array of nozzles 20. Built in manual valves 5 allow for the individual heads to be disconnected during maintenance, transportation, motion of the heads, or for purging.

The secondary or temporary reservoir 10 comprises a low profile-to-diameter cup-like structure with a thin plastic membrane 11 loosely fitted over the top but sealed to prevent spilling of the ink. An air bleed valve 12 is provided to allow the reservoir to fill. The membrane generally about 1 mil in thickness may be prepared from any suitable flexible material that would be chemically unreactive with the ink being used, such as polyolefins of the nature of polyethylene or other polymeric materials such as polytetrafluoethylene. The thin flexible membrane 11 which serves as the top enclosure for the secondary ink reservoir has a small reflective spot 13 in the center thereof. Located immediately above the maximum elevation of the reflective spot of the flexible membrane is a proximity device in the form of a level sensing mechanism 14 comprising a light emitting diode (LED) and a phototransistor which is present to detect a change in fluid level. However, it is within the scope of the present invention that other types of level sensing mechanisms can be used. For example, a sensing mechanism relying on capacitive coupling, magnetic proximity sensors, or other types of optical sensing means such as using an incandescent lamp as a light source and a photodiode light detector. The height of the membrane determines the amount of reflective light reaching the photo—transistor. When the membrane is at its lowest point, a signal activates a pump to refill the reservoir. If the membrane fails to return to its maximum height within a predetermined time indicating either a clog in the film or the ink supply is depleted, a signal is activated. Initiation of the low ink signal however does not preclude continued operation of the printer. A sufficient quantity of ink still remains in the reservoir to supply the ink jets for additional periods of time, the length of which depends upon the volume of the secondary reservoir.

A transparent protective cover 15 is provided above the flexible membrane 11 of the reservoir 10. The cover serves to physically protect the flexible membrane as well as preventing the membrane from over expanding, particularly during purging of the ink jet lines (further discussed below). Thus, the protective cover 15 will be positioned about 1/32" above the flexible membrane 14 when the membrane is in its normal convex position.

The secondary reservoir is mechanically attached to the ink jet print heads of the printer whether in a configuration of one print head or an array of ink jet print heads. This mechanical attachment insures that the position of the reservoir is fixed at the same level with respect to the ink jet print heads thus enabling a constant static pressure to be maintained within the system. If the reservoir is displaced above the orifices of the ink jet nozzles an unwanted constant stream of ink develops; if the reservoir drops substantially below the orifices a back flow of ink toward the reservoir develops. For purposes of the instant discussion the miniscus of the secondary reservoir is maintained between one and two inches below the level of the orifices of the ink jet nozzles. In operation, ink is drawn from the secondary reservoir to the ink jet orifice by capillary action. The pump slowly refills the secondary reservoir at a rate of from about 0.01 to 0.5 ml./min. while printing from the ink jet print head continues.

The ink supply configuration of the present invention is utilized to purge the ink jet print heads by pumping the ink through the system at a much higher flow rate (about 10 ml/min.) than the refill rate of 0.01-0.5 ml./min. Thus the secondary reservoir fills quickly permitting ink to continue through to the ink jet array. In a normal print operation the refill ink pumped to the secondary reservoir fills the reservoir without purging the heads since the pressure required for refilling the reservoir and deflecting the flexible membrane is much less than that needed to flood the ink jet orifices. The protective cover 15 prevents the flexible membrane from over-expanding during the purging operation thus maintaining the integrity of the membrane. If the membrane is allowed to overexpand and thus stretch out of shape, it will impact and cover the light sensor causing a constant no ink signal, as well as not relax to its original shape. The manual valves 5 discussed above provide the capability to disconnect and purge the ink jet heads selectively.

Figure 2:
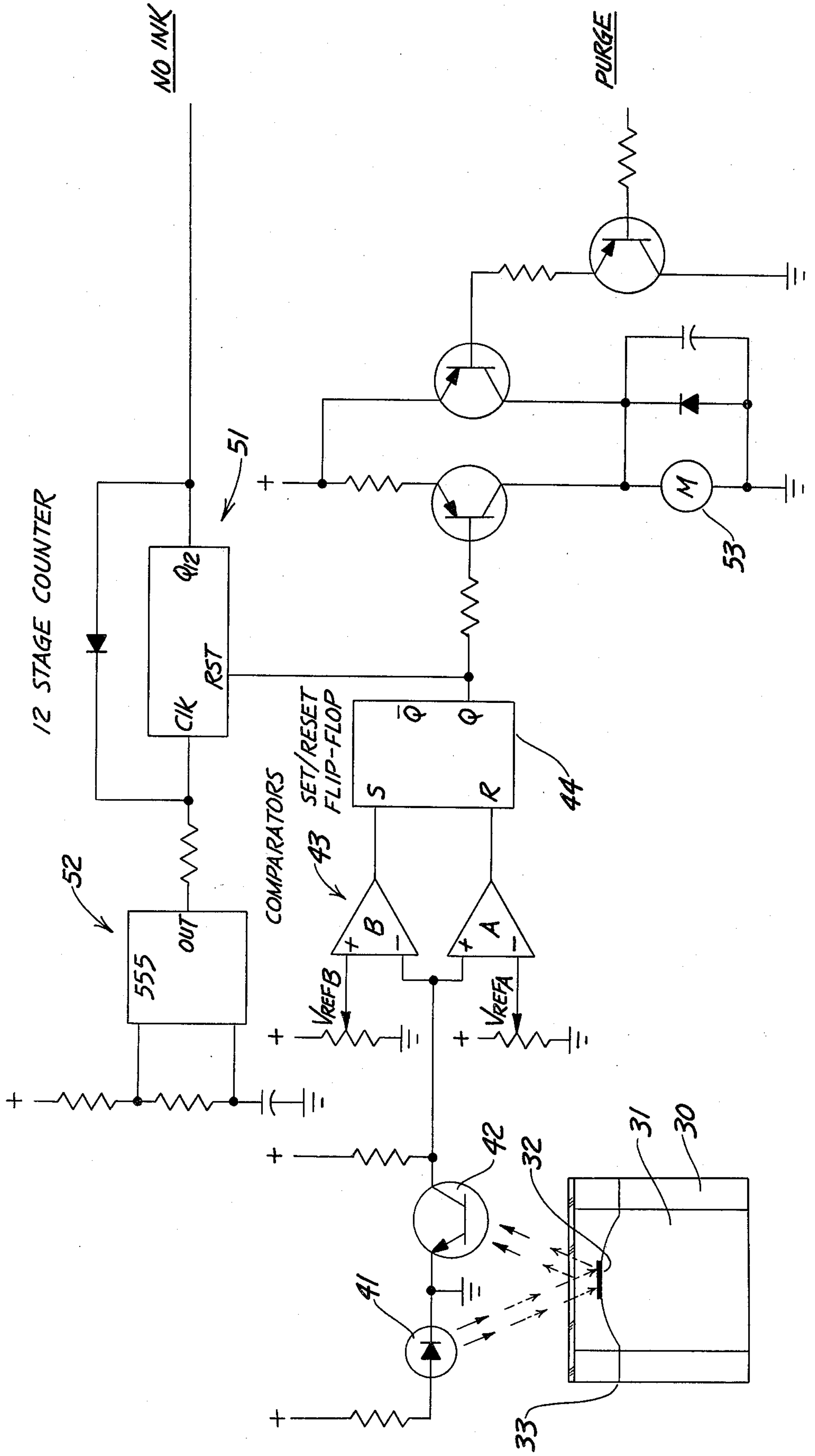
FIG. 2 represents a schematic illustrating the electrical response experienced as a result of the function of the level sensing mechanism of the instant invention.

Referring now to FIG. 2, the electronic control system will be further described. The supply reservoir 30 containing ink 31 is positioned beneath a proximity device comprising a light emitting diode (LED) 41 and photo-transistor 42. The proximity device is placed over a small white reflective dot 32 located in the center of the flexible ink reservoir diaphragm or membrane 33. As the dot on the diaphragm moves up and down with the ink level, the photo-transistor receives more or less reflected light. This light provides the base current in the photo-transistor, proportionally turning it on or off, and therefore lowering or raising the collector voltage. When the reservoir is full, the collector voltage is at its lowest, gradually increasing toward the supply voltage as the ink level drops. Transparent protective lid 34 is positioned above the flexible diaphragm 32. The collector voltage is input to a pair of comparators 43A and 43B which have adjustable reference voltage inputs. When the input voltage is less than the reference Voltage B, Output B goes high, indicating that the reservoir is full. Since the output of the detector varies with ink level, by adjusting reference Voltage B, the maximum ink level can be adjusted. Comparator A works in a similar fashion for detecting the low ink level. When the input voltage is above reference Voltage A (being above Voltage B, Output B is off), Output A goes high, indicating a low ink level. The two comparator outputs are fed into a set/reset flip-flop 44. When the ink level reaches the lowest level, Comparator B senses the level and sets the flip flop. This, in turn, turns the ink supply pump motor on. Since the output is latched, no hysteresis is required on the comparators.

A continuously running clock 52 is fed to a counter 51 whose normally active reset line is not active while the reservoir is being filled by the pump motor 53. If the reservoir does not fill within a set time period, the counter will count to its maximum value. When the counter reaches its maximum value, a no-ink output signal is generated. Since the diode shunts the counter, feeding the counter output to its input, no further clock pulses are received, and the no-ink signal is maintained.

The ink supply system of the present invention has been implemented in an ink jet printer having a plurality of ink jet print heads. Each ink jet print head is provided with a multitude of ink jet orifices of from about 10–12 orifices per print head. For purposes of the present discussion more than one and generally seven of such ink jet print heads are considered to be an array.

The volume of the secondary ink supply reservoir is determined by the following equation:

$$V = \pi h \left( R^2 + \frac{h^2}{3} \right)$$

wherein h=the height of the deflection of the flexible membrane, and

R=the radius of the reservoir.

A typical reservoir having dimensions of about 2 inches in diameter with one quarter inch total deflection of the thin flexible membrane will allow for about thirty minutes of continuous operation. This would, according to the above equation, require a reservoir having a volume of about 6.5 ml.

The use of the temporary reservoir of the present invention is primarily intended to supply an array of impulse ink jets approximately at the same elevation. However, it could also serve a single impulse ink jet where extended intervals between ink refills are desired. The compactness of the reservoir simplifies any mechanism necessary to keep the reservoir at the same relative level as the ink jets when they are moved. Thus, the reservoir can be located extremely close to the ink jets.

The invention being best described, it will be obvious that the same may be varied in many ways. Such variations are not to be regarded as a departure from the spirit and scope of the invention and all such modifications as would be obvious to one skilled in the art are intended to be included in the scope of the following claims.

It is claimed:

1. An ink supply system for an impulse type ink jet printer which comprises in combination a primary ink supply container for said printer, a secondary ink supply reservoir which communicates with and receives ink from said primary ink supply container, a level sensing mechanism juxtapositioned above said secondary ink supply reservoir for detecting a change in fluid level within said secondary reservoir and means for directing ink from said secondary ink supply reservoir to at least one ink jet print head of said ink jet printer.

2. The ink supply system as disclosed in claim 1 wherein said secondary ink supply reservoir comprises a flexible membrane forming the upper surface thereof, said membrane having a reflective spot on the center thereof.

3. The ink supply system as disclosed in claim 2 wherein said level sensing mechanism comprises a light emitting diode and a phototransistor which together with the reflective spot on said membrane detects changes in the fluid level within said secondary ink supply reservoir in response to movement of said flexible membrane.

4. The ink supply system as disclosed in claim 2 wherein said flexible membrane is protected by a transparent cover.

5. The ink supply system as disclosed in claim 1 wherein said secondary ink supply reservoir further includes an air bleed valve.

6. The ink supply system as disclosed in claim 1 further including a pump for delivering the ink or writing fluid to the secondary reservoir.

7. The ink supply system as disclosed in claim 6 wherein said pump is a peristaltic pump.

8. The ink supply system as disclosed in claim 6 further including a replaceable filter cartridge in services between said pump and said secondary reservoir.

9. The ink supply system as disclosed in claim 1 further including a quick disconnect valve located between said primary and secondary ink supply sources which controls the flow of ink between said ink supply sources and provides a double seal which enables the secondary reservoir to be disconnected from the primary supply source.

10. A reservoir complex for the controlled introduction of a writing fluid to an impulse type ink jet printer which comprises a low profile-to-diameter cup-like structure having a thin flexible membrane for its upper surface, a level sensing mechanism positioned above said structure which detects the change in fluid level within said cup like structure and means for delivering said writing fluid upon demand to a ink jet print head.

11. The reservoir as disclosed in claim 10 wherein said flexible membrane has a reflective spot on the center thereof and further includes a transparent protective cover over said flexible membrane.

12. An impulse type ink jet printer comprising in combination at least one ink jet print head having at least one ink jet orifice therein, an ink supply system comprising a primary ink supply container and a secondary ink supply reservoir which receives ink from said primary ink supply container, a level sensing mechanism located above said secondary ink supply reservoir which detects a change in fluid level in said reservoir, and means for communicating ink from said secondary reservoir to each said respective ink jet print head.

13. The ink jet printer as disclosed in claim 12 wherein each ink jet print head comprises from 10–12 orifices.

14. The ink jet printer as disclosed in claim 13 comprising an array of seven such ink jet print heads.

15. The ink jet printer as disclosed in claim 12 wherein the secondary ink supply reservoir comprises a flexible membrane as its upper surface having a reflective spot in the center thereof.

16. The ink jet printer as disclosed in claim 15 wherein said level sensing mechanism comprises a light emitting diode and a phototransistor which together with the reflective spot of said membrane detects changes in the fluid level within said secondary ink supply reservoir.

17. The ink jet printer as disclosed in claim 12 wherein said ink supply system further includes a pump means for directing the ink from the primary container to the secondary reservoir.

18. The ink jet printer as disclosed in claim 17 wherein said pump means is a peristaltic pump.

19. The ink jet printer as disclosed in claim 12 wherein manual valves are provided for connecting each of said means for communicating ink from said secondary reservoir to each respective ink jet print head.

20. An ink supply system for providing ink to an impulse type ink jet printer which comprises a primary ink supply source, a secondary ink reservoir, a pump motor means connected to said primary ink from said supply source for pumping ink from said supply source to said secondary reservoir, said pump motor means not pumping said ink to said secondary reservoir when the level of said ink in said secondary reservoir is equal to or greater than a predetermined value, and controlling means responsive to the level of said ink in said secondary ink reservoir for sensing the level of said ink in said reservoir and for starting the pumping of said pump motor means when the level of said ink in said reservoir drops below said predetermined value, said controlling means stopping the pumping of said pump motor means when the level of said ink in said reservoir becomes substantially equal to or greater than said predetermined value.

21. An ink supply system as defined in claim 20 wherein said controlling means comprises a sensing means for sensing the level of said ink in said reservoir and developing an output signal when said level falls below said predetermined value, and a switching means responsive to said output signal from said sensing means for switching to a first switched condition in response to said output signal and for switching to a second switched condition in response to the absence of said output signal, said pump motor means pumping said ink from said supply source to said reservoir in response to the switching of said switching means to said first switched condition, said pump motor means not pumping said ink from said supply source to said reservoir in response to the switching of said switching means to said second switched condition.

22. An ink supply system as defined in claim 21 wherein said switching means further comprises a comparator means responsive to said output signal from said sensing means and to a reference value signal for comparing said output signal with said reference value signal and for developing a first comparator output when said output signal from said sensing means is equal to or greater than said reference value, said comparator means developing a second comparator output when said output signal is less than said reference value, flip flop means for switching to a first switched state in response to said first comparator output and for switching to a second switched state in response to said second comparator output, said pump motor means pumping said ink from said supply source to said reservoir when said flip flop means has switched to said first switched state, and said pump motor means not pumping said ink from said supply source to said reservoir when said flip flop means has switched to said second switched state.

23. An ink supply system as defined in claims 21 or 22 further comprising an indicating means for developing an indicating signal when the level of said ink in said secondary reservoir is equal to or greater than said predetermined value, said indicating signal being indicative of a full level of said ink in said reservoir.

24. An ink supply system as defined in claim 23 wherein said indicating means comprises a clock means for providing a supply of clock signal pulses, and counter means responsive to the switched condition of said switching means and to the supply of clock signal pulses for initiating a count when the level of said ink in said reservoir drops below said predetermined value, said counter means developing said indicating signal when said counter means counts to a maximum count value.

* * * * *